United States Patent
Kim

(10) Patent No.: US 10,272,798 B2
(45) Date of Patent: Apr. 30, 2019

(54) STARTING CONTROL METHOD OF FUEL CELL VEHICLE

(71) Applicant: Hyundai Motor Company, Seoul (KR)

(72) Inventor: Dae Jong Kim, Yongin (KR)

(73) Assignee: Hyundai Motor Company, Seoul (KR)

( * ) Notice: Subject to any disclaimer, the term of this patent is extended or adjusted under 35 U.S.C. 154(b) by 285 days.

(21) Appl. No.: 15/254,639

(22) Filed: Sep. 1, 2016

(65) Prior Publication Data

US 2017/0297449 A1 Oct. 19, 2017

(30) Foreign Application Priority Data

Apr. 18, 2016 (KR) .......................... 10-2016-0046784

(51) Int. Cl.
| | |
|---|---|
| *B60L 11/18* | (2006.01) |
| *H01M 8/04* | (2016.01) |
| *G06F 19/00* | (2018.01) |
| *H01M 8/0432* | (2016.01) |
| *H01M 8/04701* | (2016.01) |
| *H01M 8/04302* | (2016.01) |

(52) U.S. Cl.
CPC ..... *B60L 11/1888* (2013.01); *H01M 8/04302* (2016.02); *H01M 8/04358* (2013.01); *H01M 8/04701* (2013.01); *B60L 2260/20* (2013.01); *H01M 2250/20* (2013.01); *Y02T 90/32* (2013.01)

(58) Field of Classification Search
CPC .. B60L 11/18; B60L 11/1885; B60L 11/1892; B60L 1/003; G06F 19/00; H01M 8/04
See application file for complete search history.

(56) References Cited

U.S. PATENT DOCUMENTS

| | | | | |
|---|---|---|---|---|
| 2011/0087389 | A1* | 4/2011 | Burleigh | B60L 11/1885 701/22 |
| 2015/0056530 | A1* | 2/2015 | Nishikawa | B60L 1/003 429/437 |
| 2015/0120111 | A1* | 4/2015 | Kim | B60L 11/1885 701/22 |
| 2015/0270565 | A1* | 9/2015 | Song | B60L 11/1892 701/22 |

FOREIGN PATENT DOCUMENTS

| | | |
|---|---|---|
| KR | 10-2008-0067381 A | 7/2008 |
| KR | 10-2009-0039253 A | 4/2009 |
| KR | 10-0967217 B1 | 7/2010 |

(Continued)

OTHER PUBLICATIONS

Extended European Search Report for European Patent Application No. 16191641.6, dated Aug. 30, 2017, 9 pages.

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A starting control method and system of a fuel cell vehicle are provided. The method includes detecting a cold-running-mode condition including a fuel-cell coolant temperature during stoppage of the vehicle and determining whether the coolant temperature is less than a first set value that is preset in a memory. A vehicle restarting process in the memory is then set using information regarding a vehicle state during the stoppage of the vehicle when the coolant temperature is less than the first set value.

14 Claims, 2 Drawing Sheets

(56) References Cited

FOREIGN PATENT DOCUMENTS

| KR | 10-2011-0023598 A | 3/2011 |
|---|---|---|
| KR | 10-2014-0029791 | 3/2014 |
| KR | 10-2014-0078948 | 6/2014 |
| KR | 10-2014-00754556 | 6/2014 |
| KR | 10-2014-00866698 | 7/2014 |
| KR | 10-1439058 B1 | 11/2014 |
| KR | 10-2015-0074310 A | 7/2015 |
| KR | 10-2015-0078448 A | 7/2015 |

\* cited by examiner

STARTING CONTROL METHOD OF FUEL CELL VEHICLE

CROSS REFERENCE TO RELATED APPLICATION

The present application claims priority to Korean Patent Application No. 10-2016-0046784, filed Apr. 18, 2016, the entire contents of which is incorporated herein for all purposes by this reference.

BACKGROUND

1. Field of the Invention

The present invention relates to a starting control method of a fuel cell vehicle, and more particularly, to a starting control method and system capable of guaranteeing running stability upon subsequent starting by storing information regarding vehicle states when the fuel cell vehicle stops in a low-temperature state and applying the information to a restarting step during a restart.

2. Description of the Related Art

Generally, a fuel cell generates electricity through an electrochemical reaction between hydrogen, which is fuel, and oxygen in the air, and produces heat and water as reaction byproducts. Thus, water remaining in a fuel cell stack in a fuel cell vehicle equipped with a fuel cell may freeze under ambient conditions below zero when the vehicle is parked for a substantial period of time during the colder weather conditions. This significantly deteriorates cold startability.

Therefore, unless water remaining in the stack is removed during a key-off operation when the ambient temperature is low, it may be difficult to perform the next cold-starting operation due to the frozen water. In other words, when the vehicle is started when ice formed in the stack is not melted, the ice blocks or obstructs the path for supplying the hydrogen and the air, and leads to startup failure. Consequently, it may be difficult for the fuel cell to operate normally.

Accordingly, various control methods have been proposed to perform a cold shut down (CSD) function for discharging and removing water from the stack by supplying a substantial amount of air to the stack in an idle state for a certain period of time during the stoppage of the fuel cell. A developed method of the related art proposes a cold-starting stopping method of a fuel cell vehicle, which is capable of removing ice from the stack in a low-temperature state.

However, such a method is problematic in that the temperature of the stack must be increased to remove ice from the stack, and thus, latent heat resulting from a momentary increase in stack temperature may cause a problem. In particular, when the vehicle is started again during a de-icing step, a driver may not accurately know the temperature of the fuel cell stack. Consequently, the driver may undesirably operate a vehicle in a normal running mode even when a cold-running mode is more appropriate.

The foregoing is designed merely to aid in the understanding of the background of the present invention, and is not intended to mean that the present invention falls within the purview of the related art that is already known to those skilled in the art.

SUMMARY

Accordingly, the present invention provides a starting control method and system of a fuel cell vehicle capable of safely restarting a vehicle using information upon stoppage, at a restarting step, even when the fuel cell vehicle is stopped at a low temperature.

In order to accomplish the above object, the present invention is intended to propose a starting control method of a fuel cell vehicle that may include detecting a cold-running-mode condition including a fuel-cell coolant temperature, by a controller, during stoppage of the vehicle; determining whether the coolant temperature is less than a first set value that is preset in a memory, by the controller; and setting a vehicle restarting process in the memory using information regarding a vehicle state during the stoppage of the vehicle, by the controller, when the coolant temperature is less than the first set value.

The method may further include, after determining whether the coolant temperature is less than a first set value, deleting the vehicle restarting process that is set in the memory, by the controller, when the coolant temperature is equal to or greater than the first set value. The method may further include, after setting a vehicle restarting process, deriving an elapsed time from when the vehicle is stopped to when a restarting signal is received, in response to receiving the restarting signal of the vehicle, by the controller; determining whether the elapsed time from when the vehicle is stopped to when the restarting signal is received is less than a reference time that is preset in the memory, by the controller; and holding the vehicle restarting process that is set in the memory, by the controller, when the elapsed time from when the vehicle is stopped to when the restarting signal is received is less than the reference time.

The method may further include, after holding the vehicle restarting process, restarting the vehicle according to the vehicle restarting process set in the memory during restarting, by the controller; and setting a vehicle driving mode to a cold-running mode, by the controller. The restarting process may include determining whether the coolant temperature, detected when the vehicle is stopped, is less than a second set value, by the controller, the second set value being less than the first set value, which is preset in the memory; and increasing a temperature of a fuel cell stack, by the controller, when the coolant temperature is less than the second set value.

The method may further include, after determining whether the elapsed time from when the vehicle is stopped to when the restarting signal is received is less than a reference time, deleting the vehicle restarting process set in the memory, by the controller, when the elapsed time from when the vehicle is stopped to when the restarting signal is received exceeds the reference time. The method may further include, after the deleting process, detecting a temperature of a fuel cell coolant, by the controller, when the vehicle is restarted; determining whether the temperature of the coolant is less than the second set value, by the controller, the second set value being less than the first set value, which is preset in the memory; increasing a temperature of a fuel cell stack, by the controller, when the coolant temperature of the vehicle is less than the second set value; and setting the vehicle driving mode to a cold-running mode by the controller.

The method may further include determining whether the temperature of the coolant is less than the first set value, which is preset in the memory, by the controller, when the coolant temperature of the vehicle is equal to or greater than the second set value; and setting the vehicle driving mode to the cold-running mode, by the controller, when the coolant temperature of the vehicle is less than the first set value. The method may further include setting the vehicle driving mode to a normal mode, by the controller, when the coolant temperature of the vehicle is equal to or greater than the first set value.

Further, the present invention is intended to propose a starting control system of a fuel cell vehicle that may include a deriving unit configured to derive a cold-running-mode condition including a fuel-cell coolant temperature; a memory unit configured to store a vehicle restarting process and a first set value; and a controller configured to compare the coolant temperature with the first set value, which is set in the memory, and then set the vehicle restarting process in the memory using information regarding a vehicle state during stoppage of the vehicle, when the coolant temperature is less than the first set value. The various unit of the system may be executed by the controller.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
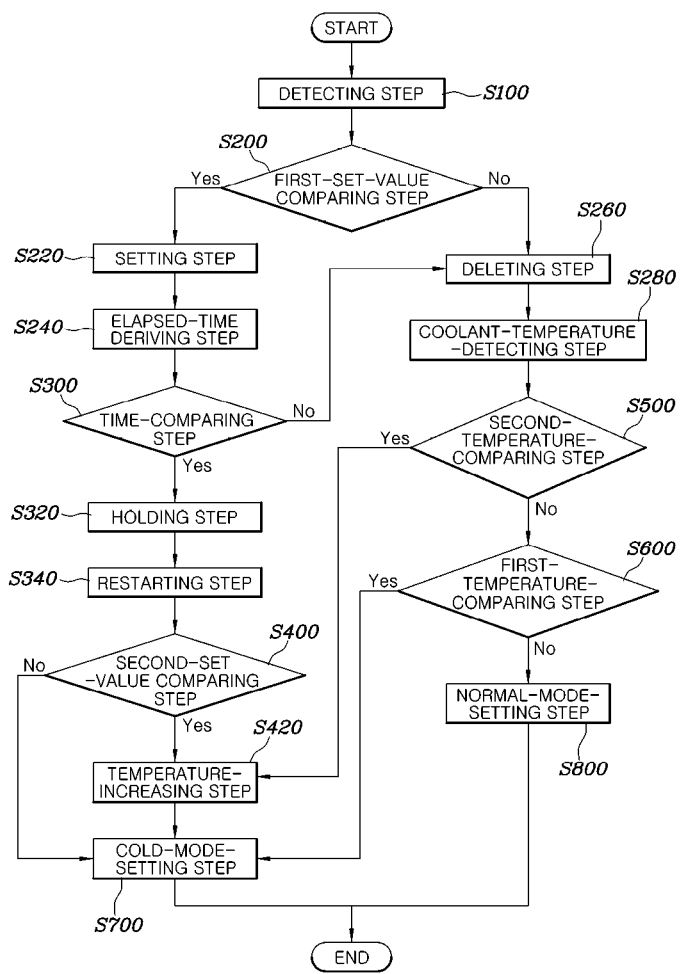
FIG. 1 is a flowchart illustrating a starting control method of a fuel cell vehicle according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described with reference to the accompanying drawings.

As shown in FIG. 1, a starting control method according to the present invention may include detecting, by a controller, a cold-running-mode condition including a fuel-cell coolant temperature during stoppage of the vehicle (S100), determining, by the controller, whether the coolant temperature is less than a first set value that is preset in a memory (S200), and setting, by the controller, a vehicle restarting process in the memory using information regarding the vehicle state during the stoppage of the vehicle when the coolant temperature is less than the first set value (S220).

At the detecting step S100, the cold-running-mode condition may use various factors, such as the heat value of the stack or the estimated temperature of the fuel cell stack, as well as the coolant temperature. The coolant temperature may be detected using various methods. A sensor may be attached to directly sense the temperature of the fuel cell coolant and then directly transmit information regarding the temperature to the controller. Alternatively, the controller may be configured to derive the coolant temperature using various variables for deriving the coolant temperature, for example, information such as the electric current of the fuel cell stack. Since the present invention sets the restarting process using the temperature of the fuel cell coolant, the temperature of the fuel cell coolant should be measured accurately. Thus, a sensor that is capable of directly detecting the temperature of the coolant may be used.

When the coolant temperature has been detected using the above-described methods, whether the detected coolant temperature value is less than the first set value, which is set in the memory may be compared. In particular, the first set value may be variously set based on the type of vehicle. However, the first set value generally indicates the value of the coolant temperature when the fuel cell vehicle is not driven in a normal mode.

In the fuel cell vehicle, the temperature of the fuel cell stack is an important factor since the fuel cell vehicle is configured to generate energy according to the principle whereby hydrogen reacts with oxygen, water, which is a by-product of the reaction of hydrogen with oxygen, is always present in the fuel cell. Therefore, when the fuel cell temperature falls below the freezing point of water, the water remaining in the fuel cell freezes and the efficiency of the fuel cell is deteriorated. Thus, when the temperature of the fuel cell vehicle is low (e.g., less than a particular temperature), the vehicle does not directly enter a normal running mode, but enters a cold mode when being started, to enhance the efficiency of the fuel cell and ensure the running stability of the vehicle.

Therefore, in the present invention, the first set value may be the value of the coolant temperature at which the water in the fuel cell freezes, thus deteriorating the efficiency of the fuel cell vehicle. Since the freezing point of water is usually 0° C., the first set value may be established as 0° C. However, the temperature detected by the controller is not the temperature of the fuel cell stack but the temperature of the fuel cell coolant. Accordingly, the first set value may be set to a value other than 0° C.

As described above, when the coolant temperature detected by the controller is less than the first set value, the running state of the vehicle during the stoppage of the vehicle is not normal (e.g., abnormal, operating with an error, etc.). Thus, it is necessary to input information upon the stoppage into the controller when the vehicle is restarted since a driver may incorrectly determine the actual state of the vehicle from the information regarding the vehicle state, by the controller, when the vehicle is restarted, due to given steps performed after the stoppage.

For example, it may be assumed that the starting of the fuel cell vehicle is ON when the vehicle must progress through the low-temperature state, namely, the cold-running mode, and then the vehicle may be stopped when the vehicle does not enter the normal running mode. In particular, since the vehicle does not enter the normal mode, the vehicle must progress through the cold-running mode for a predetermined period of time even when the vehicle is restarted. However, after the stoppage, the fuel cell vehicle may activate a resistor disposed within the fuel cell vehicle to thus decrease the voltage of the stack. Further, a coolant pump may be driven to prevent the resistor from overheating, and the coolant may be circulated, whereby the temperature of the coolant may increase. Consequently, due to the increase in the temperature of the coolant, the controller may be configured to determine that the vehicle may run or operate normally (e.g., without error) when it is restarted, whereby the vehicle may undesirably enter the normal running mode without going through the cold-running mode.

Therefore, to prevent this problem, the method of the present invention includes setting the vehicle restarting process in the memory using the information regarding the vehicle state during the stoppage of the vehicle. As illustrated in FIG. 1, the method may further include deleting, by the controller, the vehicle restarting process that is set in the memory when the coolant temperature is equal to or greater than the first set value (S260).

As described above, when the coolant temperature is equal to or greater than the first set value, the vehicle may be determined to have been running normally when stopped. Thus, there is no possibility that unexpected mistakes or errors occur during the restarting due to a series of steps after the stoppage. Therefore, when the coolant temperature is equal to or greater than the first set value, the vehicle may be subjected to the starting process using vehicle information in the starting state. Accordingly, the restarting process that is set in the memory may be deleted.

Furthermore, in response to determining that the coolant temperature is less than the first set value and thus the setting of the vehicle restarting process is performed (S220), as shown in FIG. 1, the following steps may be performed: deriving an amount of time that has elapsed from when the vehicle was stopped to when a restarting signal is received, in response to receiving the restarting signal of the vehicle by the controller (S240); determining whether the elapsed time from when the vehicle was stopped to when the restarting signal is received is less than a reference time that is preset in the memory, by the controller (S300); and holding (e.g., pausing) the vehicle restarting process that is set in the memory, by the controller, when the elapsed time from when the vehicle is stopped to when the restarting signal is received is less than the reference time (S320).

There are many cases that may be adopted as the restarting signal in the elapsed-time deriving process of the present invention. For example, a driver inputting an ignition-on signal to the vehicle may be adopted as the restarting signal, determining that a main relay on a drive unit of the vehicle is on may be adopted as the restarting signal, and the activation of the fuel cell may be adopted as the restarting signal. Therefore, this may be variously set by the controller based on the type and state of the vehicle. Likewise, it may be possible to variously set the time adopted as the stoppage of the vehicle, for example, the time when the vehicle receives an ignition-off signal, the time when the main relay on the drive unit is off, or the time when the activation of the fuel cell is off.

When both the time adopted as the restarting signal and the time adopted as the stoppage of the vehicle are determined, the time-comparing process S300 may be performed to derive the elapsed time from when the vehicle was stopped to when the restarting signal is received and then whether the elapsed time is less than the reference time that is preset in the memory may be determined. In particular, the restarting process using information regarding the vehicle state at the time of stoppage may be omitted when the elapsed time from the stoppage to the restarting is substantial (e.g., greater than a predetermined time period). As described above, the present invention provides the restarting process using the information regarding the vehicle state during the stoppage to remove a potential error during the restarting, particularly, an error relating to the temperature of the fuel cell coolant. However, when the elapsed time from the stoppage to the restarting is substantial, such an error may be prevented.

Additionally, the increase in coolant temperature due to the operation of the resistor may be temporary after the stoppage. Therefore, when sufficient time has passed or elapsed since stoppage, the coolant temperature may be assumed to have returned to an original temperature. Thus, the restarting using the restarting process may be omitted. Therefore, as shown in FIG. 1, the present invention provides the process of deleting the vehicle restarting process that is set in the memory when the elapsed time from when the vehicle was stopped to when the restarting signal is received exceeds the reference time (S260). In particular, the reference time may be provided in various values, and may be calculated by various factors, including the flow rate of the fuel cell coolant, the performance of the fuel cell stack or the like.

Moreover, when the elapsed time from stoppage to when the restarting signal is received is less than the reference time, a different situation occurs. Since sufficient time has not elapsed since the stoppage, the value of the coolant temperature, changed due to the operation of the resistor or the like, may not return to the original value. Thus, the vehicle may be restarted using the vehicle restarting process that is set in the memory at the setting process S220. Accordingly, the present invention provides the process of holding the vehicle restarting process that is set in the memory when the elapsed time from when the vehicle is stopped to when the restarting signal is received is less than the reference time (S320).

After the holding process S320, as shown in FIG. 1, the present invention may perform a restarting process S340 of restarting the vehicle according to the vehicle restarting process that is set in the memory during restarting. Particularly, the restarting process includes performing startup in states other than the normal running mode. Various steps may be present based on the type of fuel cell and the type of vehicle. By way of example, it may be possible to monitor the performance of the fuel cell stack by applying a certain load to the fuel cell stack. In states other than the normal running mode, for example, the low-temperature state, the performance of the stack may be deteriorated. Thus, to detect whether the performance of the stack is normal, the method may include applying a certain load to the stack, detecting the performance thereof, and completing the starting.

In addition, the present invention may include additional steps for stably restarting the vehicle. Particularly, the method may include determining whether the coolant temperature, detected when the vehicle is stopped, is less than a second set value, by the controller, the second set value being less than the first set value, which is preset in the memory (S400), and increasing the temperature of the fuel cell stack, by the controller, when the coolant temperature is less than the second set value (S420).

At the determination of whether the coolant temperature is less than a second set value S400, a new value, namely, the second set value, appears. The second set value may be set to be less than the first set value. As described above, the first set value set in the memory may be the reference value of the coolant temperature for distinguishing between the vehicle in the normal running mode during the stoppage and the vehicle in the cold-running mode during the stoppage. Thus, the second set value, being less than the first set value, may also be the value of the coolant temperature when the vehicle is in the cold-running mode. The second set value is provided since the coolant temperature may be divided into a low-temperature state and a very-low-temperature state.

When the fuel cell vehicle is at room temperature (e.g., about 15 to 30° C.), the coolant temperature may be less likely to be in the very-low-temperature state. However, in particular situations, for example, during winter (e.g., colder weather conditions) or when the temperature of the surrounding environment is considerably low, the coolant temperature may be accordingly decreased. Therefore, it is necessary to distinguish the restarting procedure of the fuel cell vehicle in this situation from that in the general situation. Accordingly, the present invention separately offers the second set value, which becomes the reference value for use by the controller in determining whether the coolant temperature is considerably low.

Since the second set value, which is the reference value for determining the very-low-temperature state, may be provided to protect the fuel cell, the second set value may be variously set without being limited to a specific value as long as the second set value is less than the first set value. Generally, a low-temperature range, in which the fuel cell exhibits efficient performance, may be an important criterion when setting the second set value.

In response to detecting that the vehicle during the stoppage is in the very-low-temperature state, a process for protecting the fuel cell is added to the above-mentioned restarting process S340. Accordingly, the method of the present invention may include increasing the temperature of the fuel cell stack, by the controller (S420). Therefore, according to the present invention, even when the stack temperature is less than the second set value, it may be possible to increase the stack temperature, thus enhancing the durability and the efficiency of the fuel cell.

According to the present invention, regardless of whether the coolant temperature detected by the controller is less than the first set value or the second set value, the controller consequently may be configured to set the driving mode of the vehicle to the cold-running mode. In response to determining that the heat value and the performance of the stack reach a normal range, after the vehicle is driven for a predetermined period of time in the set cold-running-mode, the mode may be changed by the controller into the normal running mode.

The above-mentioned starting control method of the fuel cell vehicle employs the vehicle restarting process that is set in the memory. Thus, when the restarting process has been deleted, that is, when the coolant temperature detected at the first-set-value comparing step S200 is equal to or greater than the first set value and when the elapsed time from when the vehicle is stopped to when the restarting signal is received exceeds the reference time at the time-comparing step S300, the starting control method may not be performed as described above.

Therefore, as shown in FIG. 1, the method of the present invention may include detecting the temperature of the fuel cell coolant when the vehicle is restarted (S280), and determining whether the temperature of the coolant is less than the second set value (S500), the second set value being less than the first set value that is preset in the memory.

Thus, even when the vehicle restarting process is not present in the memory, the controller may be configured to detect the coolant temperature of the fuel cell in the above-described way and determine whether the value of the detected coolant temperature is less than the second set value. Particularly, when the coolant temperature is less than the second set value as described above, the fuel cell may be in the very-low-temperature state, and thus, a separate process may be performed to start the vehicle more stably. Thus, as shown in FIG. 1, when the coolant temperature of the vehicle is less than the second set value, the temperature of the fuel cell stack may be increased by the controller (S420) and the vehicle driving mode may be set to the cold-running mode (S700).

In addition, when the coolant temperature of the vehicle is equal to or greater than the second set value, of the method may include determining whether the temperature of the coolant is less than the first set value, which is preset in the memory (S600). Particularly, the first set value may be established as the upper limit of the coolant temperature and the second set value may be established as the lower limit thereof since the first set value corresponds to the reference value for distinguishing between the normal running mode of the fuel cell vehicle and the cold-running mode thereof, and the second set value corresponds to the reference value for determining whether the fuel cell is in the very-low-temperature state.

Therefore, in response to determining that the coolant temperature of the vehicle is less than the first set value and is equal to or greater than the second set value, the controller may be configured to set the vehicle driving mode to the cold-running mode, thus guaranteeing the running stability of the vehicle. Finally, in response to determining that the coolant temperature of the vehicle is equal to or greater than the first set value, the vehicle driving mode may be set to a normal mode (S800). The expression that the temperature of the fuel cell coolant is equal to or greater than the first set value indicates that the output of the fuel cell may be achieved even when the driving mode is directly changed to the normal mode without the cold driving mode. Therefore, the running mode of the vehicle may be set to the normal running mode simultaneously with startup, without a separate starting procedure.

Figure 2:
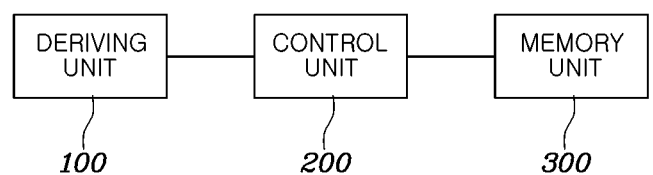
FIG. 2 is a block diagram illustrating the configuration of a starting control system of a fuel cell vehicle according to an exemplary embodiment of the present invention.

As shown in FIG. 2, a starting control system of a fuel cell vehicle according to the present invention may include a deriving unit 100 configured to derive to sense the coolant temperature of a fuel cell, a memory unit 300 configured to store a vehicle restarting process and a first set value, and a controller 200 configured to compare the coolant temperature with the first set value, which is set in a memory, and then set the vehicle restarting process to the memory using information regarding the vehicle state during stoppage of the vehicle, when the coolant temperature is less than the first set value. The controller 200 may be configured to operate the deriving unit 100 and the memory unit 300. The deriving unit 100 may be a sensor configured to measure the coolant temperature.

Particularly, the memory unit 300 may be configured to store a second set value, a reference time, a vehicle restarting process or the like as well as the first set value, according to an exemplary embodiment of the present invention. The controller 200 may be configured to perform various steps, including, in addition to comparing the coolant temperature with the first set value, comparing the coolant temperature with the second set value, deleting the vehicle restarting process, and comparing the elapsed time with a reference time.

The above-mentioned configuration may achieve the following effects.

First, a vehicle state during stoppage may be applied to a starting process when the vehicle is restarted, so that, even when a previous starting process is not a normal state, such as a cold mode, a subsequent starting operation reflects the state of the previous starting process and thereby running stability may be guaranteed in the subsequent starting.

Second, an existing mode may be divided into a low-temperature mode and a very-low-temperature mode based on the temperature of coolant, and thus, a different restarting step may be applied based on the mode, thus improving the durability of the fuel cell stack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A starting control method of a fuel cell vehicle, comprising:
   detecting, by a controller, a cold-running-mode condition including a fuel-cell coolant temperature during stoppage of the vehicle;
   determining, by the controller, whether the coolant temperature is less than a first set value that is preset in a memory; and
   setting, by the controller, a vehicle restarting process in the memory using information regarding a vehicle state during the stoppage of the vehicle when the coolant temperature is less than the first set value.

2. The starting control method of claim 1, further comprising:
   deleting, by the controller, the vehicle restarting process that is set in the memory when the coolant temperature is equal to or greater than the first set value.

3. The starting control method of claim 1, further comprising:
   deriving, by the controller, an elapsed time from when the vehicle is stopped to when a restarting signal is received, in response to receiving the restarting signal of the vehicle;
   determining, by the controller, whether the elapsed time from when the vehicle is stopped to when the restarting signal is received is less than a reference time that is preset in the memory; and
   holding, by the controller, the vehicle restarting process that is set in the memory when the elapsed time from when the vehicle is stopped to when the restarting signal is received is less than the reference time.

4. The starting control method of claim 3, further comprising:
   restarting, by the controller, the vehicle according to the vehicle restarting process that is set in the memory during the stoppage; and
   setting, by the controller, a vehicle driving mode to a cold-running mode.

5. The starting control method of claim 4, wherein the restarting process includes:
   determining, by the controller, whether the coolant temperature, detected when the vehicle is stopped, is less than a second set value, the second set value being less than the first set value, which is preset in the memory; and
   increasing, by the controller, a temperature of a fuel cell stack when the coolant temperature is less than the second set value.

6. The starting control method of claim 3, further comprising:
   deleting, by the controller, the vehicle restarting process that is set in the memory when the elapsed time from when the vehicle is stopped to when the restarting signal is received exceeds the reference time.

7. The starting control method of claim 2, further comprising:
   detecting, by the controller, a temperature of a fuel cell coolant when the vehicle is restarted;
   determining, by the controller, whether the temperature of the coolant is less than the second set value, the second set value being less than the first set value, which is preset in the memory;
   increasing, by the controller, a temperature of a fuel cell stack when the coolant temperature of the vehicle is less than the second set value; and
   setting, by the controller, the vehicle driving mode to a cold-running mode.

8. The starting control method of claim 6, further comprising:
   detecting, by the controller, a temperature of a fuel cell coolant when the vehicle is restarted;
   determining, by the controller, whether the temperature of the coolant is less than the second set value, the second set value being less than the first set value, which is preset in the memory;
   increasing, by the controller, a temperature of a fuel cell stack when the coolant temperature of the vehicle is less than the second set value; and
   setting, by the controller, the vehicle driving mode to a cold-running mode.

9. The starting control method of claim 8, further comprising:
   determining, by the controller, whether the temperature of the coolant is less than the first set value, which is preset in the memory when the coolant temperature of the vehicle is equal to or greater than the second set value; and setting, by the controller, the vehicle driving mode to the cold-running mode when the coolant temperature of the vehicle is less than the first set value.

10. The starting control method of claim 9, further comprising:

setting, by the controller, the vehicle driving mode to a normal mode when the coolant temperature of the vehicle is equal to or greater than the first set value.

11. A starting control system of a fuel cell vehicle, comprising:

a deriving unit configured to derive a cold-running-mode condition including a fuel-cell coolant temperature;

a memory unit configured to store a vehicle restarting process and a first set value; and a controller configured to compare the coolant temperature with the first set value, which is set in a memory, and set the vehicle restarting process in the memory using information regarding a vehicle state during stoppage of the vehicle, when the coolant temperature is less than the first set value.

12. The starting control system of claim 11, wherein the controller is configured to delete the vehicle restarting process that is set in the memory when the coolant temperature is equal to or greater than the first set value.

13. The starting control system of claim 11, wherein the controller is further configured to:

derive an elapsed time from when the vehicle is stopped to when a restarting signal is received, in response to receiving the restarting signal of the vehicle;

determine whether the elapsed time from when the vehicle is stopped to when the restarting signal is received is less than a reference time that is preset in the memory; and hold the vehicle restarting process that is set in the memory when the elapsed time from when the vehicle is stopped to when the restarting signal is received is less than the reference time.

14. The starting control system of claim 13, wherein the controller is further configured to:

restart the vehicle according to the vehicle restarting process that is set in the memory during the stoppage; and set a vehicle driving mode to a cold-running mode.

* * * * *